(12) United States Patent
Koh

(10) Patent No.: US 8,004,215 B2
(45) Date of Patent: Aug. 23, 2011

(54) LAMP ABNORMALITY DETECTING DEVICE AND INVERTER, BACKLIGHT DEVICE, AND DISPLAY DEVICE WHICH ARE EQUIPPED WITH THE SAME

(75) Inventor: Hideki Koh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 258 days.

(21) Appl. No.: 12/448,008

(22) PCT Filed: Jan. 21, 2008

(86) PCT No.: PCT/JP2008/050682
§ 371 (c)(1),
(2), (4) Date: Jun. 4, 2009

(87) PCT Pub. No.: WO2008/105193
PCT Pub. Date: Sep. 4, 2008

(65) Prior Publication Data
US 2010/0033097 A1    Feb. 11, 2010

(30) Foreign Application Priority Data
Feb. 26, 2007    (JP) ................................ 2007-045675

(51) Int. Cl.
G05F 1/00      (2006.01)
H05B 37/02    (2006.01)
H05B 39/04    (2006.01)
H05B 41/36    (2006.01)

(52) U.S. Cl. ......... 315/308; 315/224; 315/291; 315/307

(58) Field of Classification Search .................. None
See application file for complete search history.

(56) References Cited

U.S. PATENT DOCUMENTS
6,954,364 B2 * 10/2005 Min ........................... 363/56.08
2002/0130628 A1    9/2002 Shin
2006/0038592 A1 *  2/2006 Inoue et al. .................... 327/108

FOREIGN PATENT DOCUMENTS
JP    64-050395    2/1989
JP    1-167986    7/1989
JP    2002-231034    8/2002
JP    2006-66220    3/2006

* cited by examiner

*Primary Examiner* — Anh Q Tran
(74) *Attorney, Agent, or Firm* — Harness, Dickey & Pierce, P.L.C.

(57) ABSTRACT

One embodiment of the present invention relates to a lamp abnormality detecting device that detects an abnormality in a lamp. A maximum/minimum extraction circuit outputs, as a maximum current, a current having a maximum current value among currents supplied thereto from lamp drive circuits and outputs, as a minimum current, a current having a minimum current value. A subtraction circuit calculates a difference between the maximum current and the minimum current and outputs an amplified difference as a differential voltage. A comparison circuit compares the differential voltage with a predetermined threshold voltage and outputs a result of the comparison as a control signal. A control circuit stops the operation of the lamp drive circuit when the control signal indicates that the differential voltage is higher than the threshold voltage.

9 Claims, 7 Drawing Sheets

LAMP ABNORMALITY DETECTING DEVICE AND INVERTER, BACKLIGHT DEVICE, AND DISPLAY DEVICE WHICH ARE EQUIPPED WITH THE SAME

TECHNICAL FIELD

The present invention relates to a lamp abnormality detecting device that detects an abnormality in a lamp, and more particularly to a device that detects an abnormality caused by a conductor break or the like in a lamp used in a backlight of a display device or the like.

BACKGROUND ART

Conventionally, a liquid crystal display device is provided with a device called a backlight (hereinafter, referred to as the "backlight device") which uses a Cold Cathode Fluorescent Lamp (CCFL) or the like as a light source. For the backlight device, there are one called a "direct type" in which a plurality of light sources are arranged side by side on the back side of a display portion, and one called an "edge light type" in which a light source is arranged at one end of the display portion. In the direct type backlight device, luminance can be easily increased but since a plurality of light sources are used, luminance non-uniformity easily occurs. On the other hand, in the edge light type backlight device, a reduction in thickness can be easily achieved but it is difficult to increase the luminance.

Meanwhile, there is a direct type backlight device that adopts pseudo U-shaped lamps, each of which has two series-connected straight-tube type lamps arranged in a U shape. FIG. 7 is a block diagram showing a configuration of a conventional backlight device that adopts pseudo U-shaped lamps. The backlight device is configured by a pseudo U-shaped lamp 11 and an inverter board 12 having formed thereon circuits and the like for driving the lamp 11. The pseudo U-shaped lamp 11 is configured by a first lamp 111, a second lamp 112, and a conductor 113 that connects the lamps 111 and 112. The inverter board 12 includes a control circuit 130 and a lamp drive circuit 140. The lamp drive circuit 140 includes a first and a second transformer 141 and 142 for applying an alternating voltage to the first and second lamps 111 and 112, respectively; a switching circuit 143 that supplies a voltage to primary sides of the respective first and second transformers 141 and 142; a first and a second rectifier circuit 144 and 145 for respectively half-wave rectifying currents flowing through secondary sides of the respective first and second transformers 141 and 142; and a stabilizing circuit 146 that combines and smoothes the currents having been half-wave rectified by the first and second rectifier circuits 144 and 145. Note that although a backlight device is generally provided with a plurality of pseudo U-shaped lamps 11, FIG. 7 only shows one pseudo U-shaped lamp 11 and the lamp drive circuit 140 for driving the lamp 11 for convenience.

In such a backlight device as described above, by the switching circuit 143 performing a switching operation by control performed by the control circuit 130, alternating voltages are generated on the secondary sides of the respective first and second transformers 141 and 142. Accordingly, the first and second lamps 111 and 112 emit light. At this time, the currents flowing through the secondary sides of the respective first and second transformers 141 and 142 are respectively half-wave rectified by the first and second rectifier circuits 144 and 145 and the half-wave rectified currents are combined and smoothed by the stabilizing circuit 146. Then, based on the value of the smoothed current, the control circuit 130 controls the operation of the switching circuit 143. With such feedback control, stable currents are supplied to the first and second lamps 111 and 112.

Note that Japanese Unexamined Patent Publication No. 2002-231034 discloses an example of the configuration of a backlight device such as that described above.

[Patent Document 1] Japanese Unexamined Patent Publication No. 2002-231034

DISCLOSURE OF THE INVENTION

Problems to be Solved by the Invention

However, in the above-described backlight device, when, for example, a break occurs in the conductor 113 that connects the first lamp 111 and the second lamp 112, excess currents flow through the secondary sides of the respective first and second transformers 141 and 142 and accordingly components configuring the circuits and the like may be damaged by heat. This will be described with reference to FIGS. 8 and 9.

FIG. 8 is a diagram for describing currents flowing through the lamp 11 at normal times. In the backlight device, the first and second lamps 111 and 112 are mounted at a location a few millimeters from a metal plate configuring a part of a casing (called a "backlight angle" and the like). Hence, as shown in FIG. 8, parasitic capacitances 114 and 115 are present between the lamps 111 and 112 and the metal plate. Here, since an alternating voltage is applied to the lamps 111 and 112, currents (hereinafter, referred to as "leakage currents") that flow through the metal plate from the lamps 111 and 112 through the parasitic capacitances 114 and 115 are generated. Accordingly, when the currents flowing through the high-voltage sides of the respective lamps 111 and 112 (the currents flowing through the secondary sides of the transformers) are IA; the currents flowing through the low-voltage sides of the respective lamps 111 and 112 are Ilamp; and the leakage currents are Ileak, the following equation (1) is established. Note that for IA the currents flowing into the lamps 111 and 112 are positive, and for Ileak and Ilamp the currents flowing out of the lamps 111 and 112 are positive.

$$IA = I\text{leak} + I\text{lamp} \tag{1}$$

At normal times, a magnitude of a current Ilamp is controlled by the control circuit 130 and the lamp drive circuit 140, based on a current IA that satisfies the above equation (1).

FIG. 9 is a diagram for describing currents flowing through the lamp 11 when the conductor 113 is broken (at abnormal times). When a conductor break occurs as shown in FIG. 9, the low-voltage sides of the lamps 111 and 112 are brought into an electrically floating state and thus currents do not flow therethrough. That is, Ilamp is 0. However, since, as described above, parasitic capacitances 114 and 115 are present between the lamps 111 and 112 and the metal plate, leakage currents Ileak are generated as with at the above-described normal times. Accordingly, the following equation (2) is established at abnormal times.

$$IA = I\text{leak} \tag{2}$$

Here, a magnitude of a current Ilamp is controlled based on a current IA and upon an occurrence of a conductor break Ilamp becomes 0 and thus the value of the current IA becomes small. At this time, the control circuit 130 and the lamp drive circuit 140 operate to increase the value of the current IA. Therefore, despite the fact that a conductor break has occurred in the lamp 11, an excess current is supplied to the high-voltage sides (the secondary sides of the transformers) of the respective lamps 111 and 112. As a result, as described above, components configuring the circuits and the like are damaged.

An object of the present invention is therefore to provide a device capable of detecting an abnormality in a lamp to prevent an excess current from flowing through the lamp, and a backlight device capable of stopping the drive of lamps when an abnormality occurs in a lamp.

Means for Solving the Problems

A first aspect of the present invention is directed to a lamp abnormality detecting device that detects an abnormality occurred in any of a plurality of lamps which are feedback-controlled by a current, the lamp abnormality detecting device including:

a current detection portion that detects currents flowing through the respective lamps;

a maximum current extraction portion that extracts a current having a maximum value among the currents detected in the respective lamps by the current detection portion;

a minimum current extraction portion that extracts a current having a minimum value among the currents detected in the respective lamps by the current detection portion;

a differential circuit that calculates a differential value representing a difference between the value of the current extracted by the maximum current extraction portion and the value of the current extracted by the minimum current extraction portion and outputs the differential value; and a comparison circuit that compares the differential value outputted from the differential circuit with a threshold value which serves as a reference for whether an abnormality has occurred in the plurality of lamps, and outputs a result of the comparison.

According to a second aspect of the present invention, in the first aspect of the present invention, the comparison circuit has a voltage dividing circuit that includes at least one variable resistor and that generates a threshold voltage representing the threshold value by dividing a predetermined constant voltage, and the threshold voltage changes with a change in a resistance value of the variable resistor.

According to a third aspect of the present invention, in the first aspect of the present invention, the differential circuit includes an amplifier circuit that amplifies the difference between the value of the current extracted by the maximum current extraction portion and the value of the current extracted by the minimum current extraction portion and outputs the amplified difference as the differential value.

A fourth aspect of the present invention is directed to an inverter for driving a plurality of lamps, the inverter including:

a lamp abnormality detecting device that detects an abnormality occurred in any of the plurality of lamps which are feedback-controlled by a current;

a lamp drive circuit which includes a transformer and drives the plurality of lamps by generating an alternating voltage on a secondary side of the transformer; and a control circuit that controls operation of the lamp drive circuit, wherein the lamp abnormality detecting device includes:

a current detection portion that detects currents flowing through the respective lamps;

a maximum current extraction portion that extracts a current having a maximum value among the currents detected in the respective lamps by the current detection portion;

a minimum current extraction portion that extracts a current having a minimum value among the currents detected in the respective lamps by the current detection portion;

a differential circuit that calculates a differential value representing a difference between the value of the current extracted by the maximum current extraction portion and the value of the current extracted by the minimum current extraction portion and outputs the differential value; and a comparison circuit that compares the differential value outputted from the differential circuit with a threshold value which serves as a reference for whether an abnormality has occurred in the plurality of lamps, and outputs a result of the comparison, and the control circuit stops the operation of the lamp drive circuit when the result of the comparison outputted from the comparison circuit indicates that the differential value is larger than the threshold value.

A fifth aspect of the present invention is directed to a backlight device that emits light onto a display portion of a display device from a back side, the backlight device including:

a plurality of lamps; and an inverter having a lamp abnormality detecting device that detects an abnormality occurred in any of the plurality of lamps which are feedback-controlled by a current; a lamp drive circuit which includes a transformer and drives the plurality of lamps by generating an alternating voltage on a secondary side of the transformer; and a control circuit that controls operation of the lamp drive circuit, wherein the lamp abnormality detecting device includes:

a current detection portion that detects currents flowing through the respective lamps;

a maximum current extraction portion that extracts a current having a maximum value among the currents detected in the respective lamps by the current detection portion;

a minimum current extraction portion that extracts a current having a minimum value among the currents detected in the respective lamps by the current detection portion;

a differential circuit that calculates a differential value representing a difference between the value of the current extracted by the maximum current extraction portion and the value of the current extracted by the minimum current extraction portion and outputs the differential value; and a comparison circuit that compares the differential value outputted from the differential circuit with a threshold value which serves as a reference for whether an abnormality has occurred in the plurality of lamps, and outputs a result of the comparison, and the control circuit stops the operation of the lamp drive circuit when the result of the comparison outputted from the comparison circuit indicates that the differential value is larger than the threshold value.

According to a sixth aspect of the present invention, in the fifth aspect of the present invention, the comparison circuit has a voltage dividing circuit that includes at least one variable resistor and that generates a threshold voltage representing the threshold value by dividing a predetermined constant voltage, and the threshold voltage changes with a change in a resistance value of the variable resistor.

According to a seventh aspect of the present invention, in the fifth aspect of the present invention, the differential circuit includes an amplifier circuit that amplifies the difference between the value of the current extracted by the maximum current extraction portion and the value of the current extracted by the minimum current extraction portion and outputs the amplified difference as the differential value.

According to an eighth aspect of the present invention, in the fifth aspect of the present invention, the plurality of lamps are pseudo U-shaped lamps, each of which has two cold cathode fluorescent lamps connected to each other by a conductor and arranged in a U shape.

A ninth aspect of the present invention is directed to a display device including:

a backlight device that emits light onto a display portion of the display device from a back side, wherein the backlight device includes:
a plurality of lamps; and
an inverter having a lamp abnormality detecting device that detects an abnormality occurred in any of the plurality of lamps which are feedback-controlled by a current; a lamp drive circuits which includes a transformer and drives the plurality of lamps by generating an alternating voltage on a secondary side of the transformer; and a control circuit that controls operation of the lamp drive circuit,
the lamp abnormality detecting device includes:
a current detection portion that detects currents flowing through the respective lamps;
a maximum current extraction portion that extracts a current having a maximum value among the currents detected in the respective lamps by the current detection portion;
a minimum current extraction portion that extracts a current having a minimum value among the currents detected in the respective lamps by the current detection portion;
a differential circuit that calculates a differential value representing a difference between the value of the current extracted by the maximum current extraction portion and the value of the current extracted by the minimum current extraction portion and outputs the differential value; and
a comparison circuit that compares the differential value outputted from the differential circuit with a threshold value which serves as a reference for whether an abnormality has occurred in the plurality of lamps, and outputs a result of the comparison, and
the control circuit stops the operation of the lamp drive circuit when the result of the comparison outputted from the comparison circuit indicates that the differential value is larger than the threshold value.

EFFECTS OF THE INVENTION

According to the first aspect of the present invention, currents flowing through a plurality of lamps are detected by the current detection portion and a maximum value and a minimum value thereof are detected. Then, a differential value between the maximum value and the minimum value is compared with a threshold value which serves as a reference indicating whether an abnormality has occurred in a lamp, and a result of the comparison is outputted from the comparison circuit. Accordingly, whether an abnormality has occurred in a lamp can be easily detected by setting the threshold value to an appropriate value.

According to the second aspect of the present invention, a threshold value which serves as a reference for whether an abnormality has occurred in a lamp can be dynamically changed. For example, the threshold value can be changed according to the brightness of the lamps. Accordingly, an abnormality in a lamp can be accurately detected.

According to the third aspect of the present invention, a differential value between a maximum value and a minimum value of currents flowing through the lamps is amplified and the amplified differential value is outputted from the differential circuit. Hence, even when relatively small currents are flowing through the lamps, an amplified differential value is outputted from the differential circuit. Accordingly, even when the currents flowing through the lamps are small, an abnormality in a lamp can be detected without reducing accuracy.

According to the fourth aspect of the present invention, in the inverter that drives a plurality of lamps, the operation of the lamp drive circuit stops when a differential value between a maximum value and a minimum value of currents flowing through the lamps is larger than a threshold value which serves as a reference indicating whether an abnormality has occurred in a lamp. Hence, when an abnormality has occurred in a lamp, the supply of a current to the lamps is stopped. Accordingly, an inverter is implemented that can prevent, when an abnormality has occurred in a lamp, an excess current from flowing through the lamp.

According to the fifth aspect of the present invention, a backlight device is implemented that can prevent, when an abnormality has occurred in a lamp, an excess current from flowing through the lamp.

According to the eighth aspect of the present invention, a backlight device including pseudo U-shaped lamps is implemented that can prevent, when an abnormality has occurred in a lamp, an excess current from flowing through the lamp.

According to the ninth aspect of the present invention, a display device including a backlight device is implemented that can prevent, when an abnormality has occurred in a lamp, an excess current from flowing through the lamp.

DESCRIPTION OF THE REFERENCE NUMERALS

Figure 1:
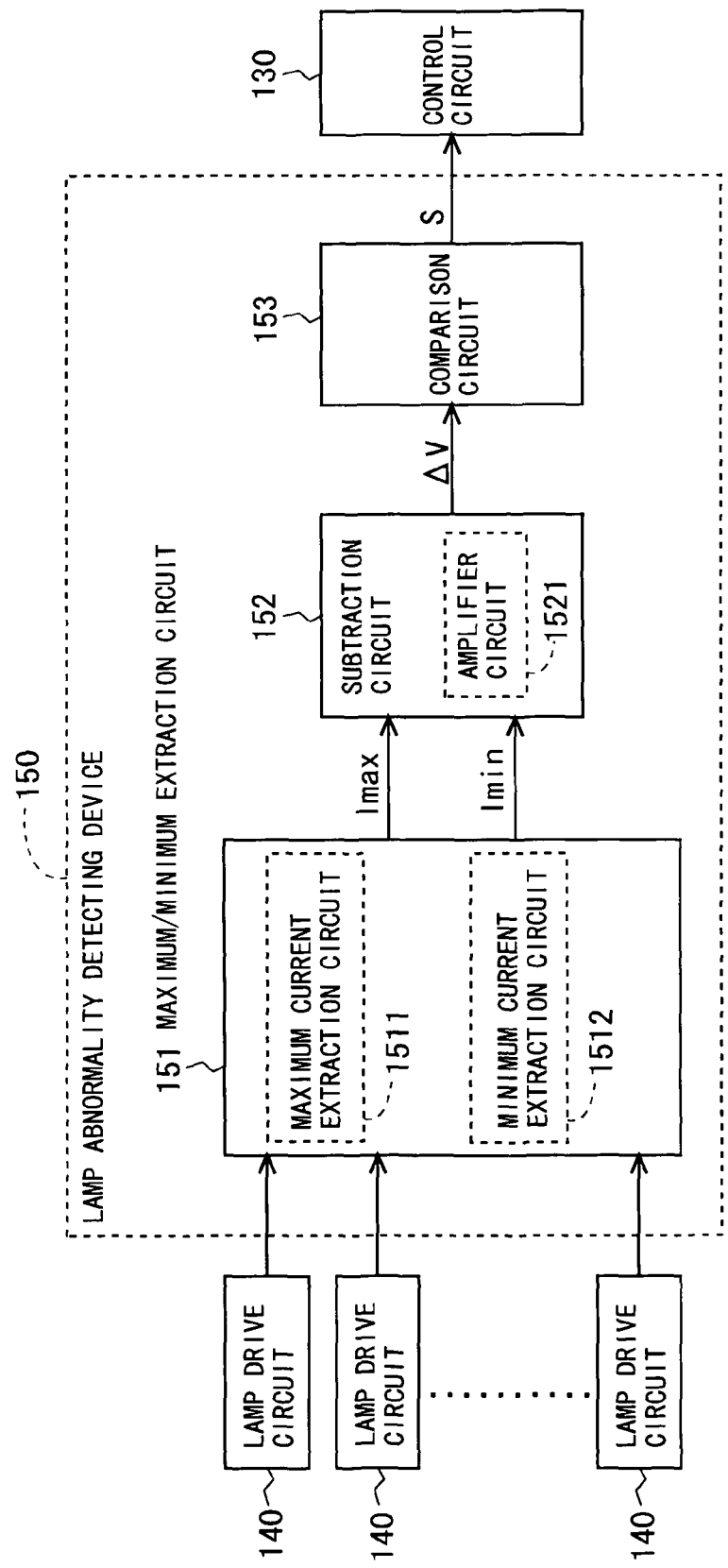
FIG. 1 is a block diagram showing a configuration of a lamp abnormality detecting device according to an embodiment of the present invention.

11: Pseudo unshaped lamp
12: Inverter board
13: Conductor
100: Backlight device
111 and 112: Lamp
130: Control circuit
140: Lamp drive circuit
141 and 142: Transformer
143: Switching circuit
144 and 145: Rectifier circuit
146: Stabilizing circuit
150: Lamp abnormality detecting device
151: Maximum/minimum extraction circuit
152: Subtraction circuit
153: Comparison circuit

BEST MODE FOR CARRYING OUT THE INVENTION

An embodiment of the present invention will be described below with reference to the accompanying drawings.

<1. Overall Configuration and Operation of a Liquid Crystal Display Device>

Figure 2:
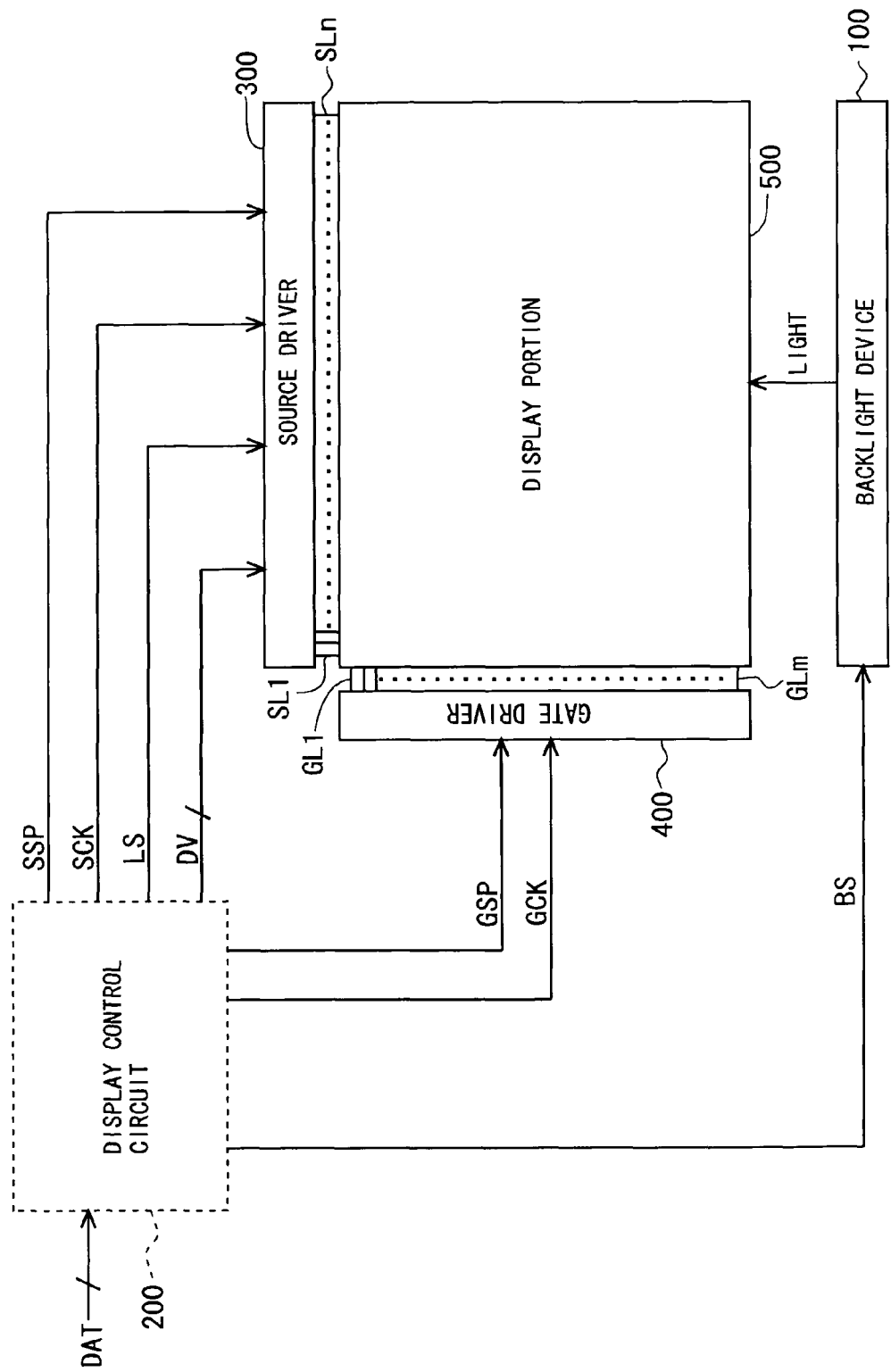
FIG. 2 is a block diagram showing an overall configuration of a liquid crystal display device including a backlight device having the lamp abnormality detecting device according to the embodiment.

FIG. 2 is a block diagram showing an overall configuration of a liquid crystal display device including a backlight device having a lamp abnormality detecting device according to an embodiment of the present invention. The liquid crystal display device includes a backlight device 100, a display control circuit 200, a source driver (video signal line drive circuit) 300, a gate driver (scanning signal line drive circuit) 400, and a display portion 500.

The display portion 500 includes a plurality of (n) source bus lines (video signal lines) SL1 to SLn; a plurality of (m) gate bus lines (scanning signal lines) GL1 to GLm; and a plurality of (n×m) pixel formation portions (not shown) respectively provided to intersection points of the plurality of source bus lines SL1 to SLn and the plurality of gate bus lines GL1 to GLm. Each pixel formation portion includes a TFT serving as a switching element; a pixel electrode connected to a drain terminal of the TFT; a common electrode and an auxiliary capacitance electrode which are commonly provided for the plurality of pixel formation portions; a liquid crystal capacitance formed by the pixel electrode and the common electrode; and an auxiliary capacitance formed by the pixel electrode and the auxiliary capacitance electrode. Then, by the liquid crystal capacitance and the auxiliary capacitance, a pixel capacitance is formed.

The display control circuit 200 receives image data DAT sent from an external source and outputs a digital video signal DV; a source start pulse signal SSP, a source clock signal SCK, a latch strobe signal LS, a gate start pulse signal GSP, and a gate clock signal GCK which are for controlling image display on the display portion 500; and a backlight control signal BS for controlling the operation of the backlight device 100.

The source driver 300 receives the digital video signal DV, the source start pulse signal SSP, the source clock signal SCK, and the latch strobe signal LS which are outputted from the display control circuit 200, and applies drive video signals to the source bus lines SL1 to SLn, respectively. The gate driver 400 repeats application of active scanning signals to the respective gate bus lines GL1 to GLm with one vertical scanning period as one cycle, based on the gate start pulse signal GSP and the gate clock signal GCK which are outputted from the display control circuit 200. The backlight device 100 emits light from the back of the display portion 500, based on the backlight control signal BS outputted from the display control circuit 200.

In the above-described manner, drive video signals are applied to the source bus lines SL1 to SLn, respectively, scanning signals are applied to the gate bus lines GL1 to GLm, respectively, and the display portion 500 is irradiated with light, whereby an image is displayed on the display portion 500.

<2. Configuration and Operation of the Backlight Device>

Figure 3:
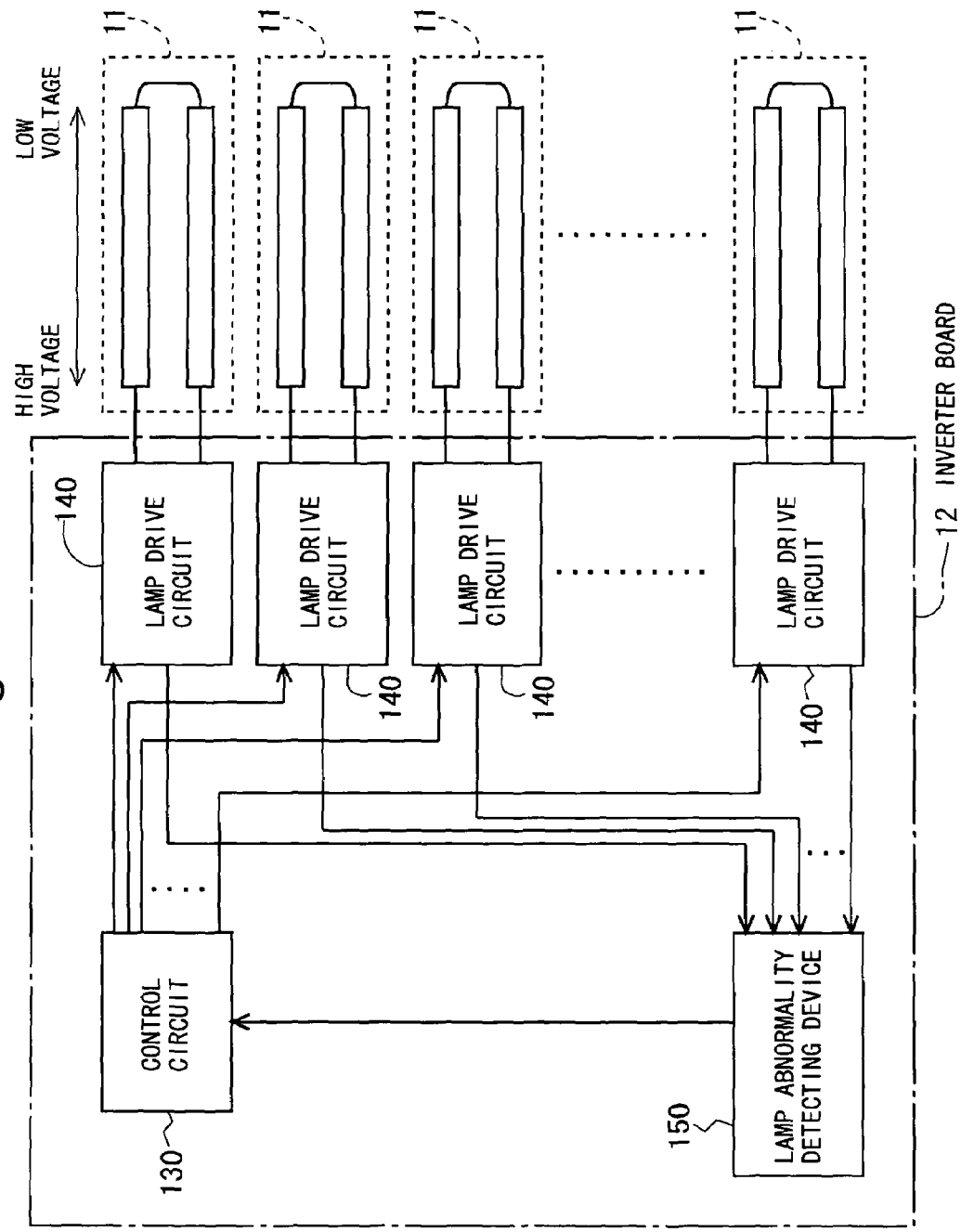
FIG. 3 is a block diagram showing a configuration of the backlight device in the embodiment.

FIG. 3 is a block diagram showing a configuration of the backlight device 100 according to the present embodiment. The backlight device 100 is configured by a plurality of pseudo U-shaped lamps 11 and an inverter board 12 having formed thereon circuits and the like for driving the lamps 11. The inverter board 12 includes a control circuit 130; a plurality of lamp drive circuits 140 for driving the plurality of lamps 11, respectively; and a lamp abnormality detecting device 150.

The control circuit 130 controls the operation of each of the plurality of lamp drive circuits 140. The lamp drive circuit 140 drives a lamp 11 based on control by the control circuit 130. The lamp drive circuit 140 also rectifies a current flowing through a high-voltage side of the lamp 11 and supplies the rectified current to the lamp abnormality detecting device 150. The lamp 11 emits light based on application of an alternating voltage thereto by the lamp drive circuit 140. The lamp abnormality detecting device 150 outputs a control signal S based on currents supplied from the respective lamp drive circuits 140.

Figure 4:
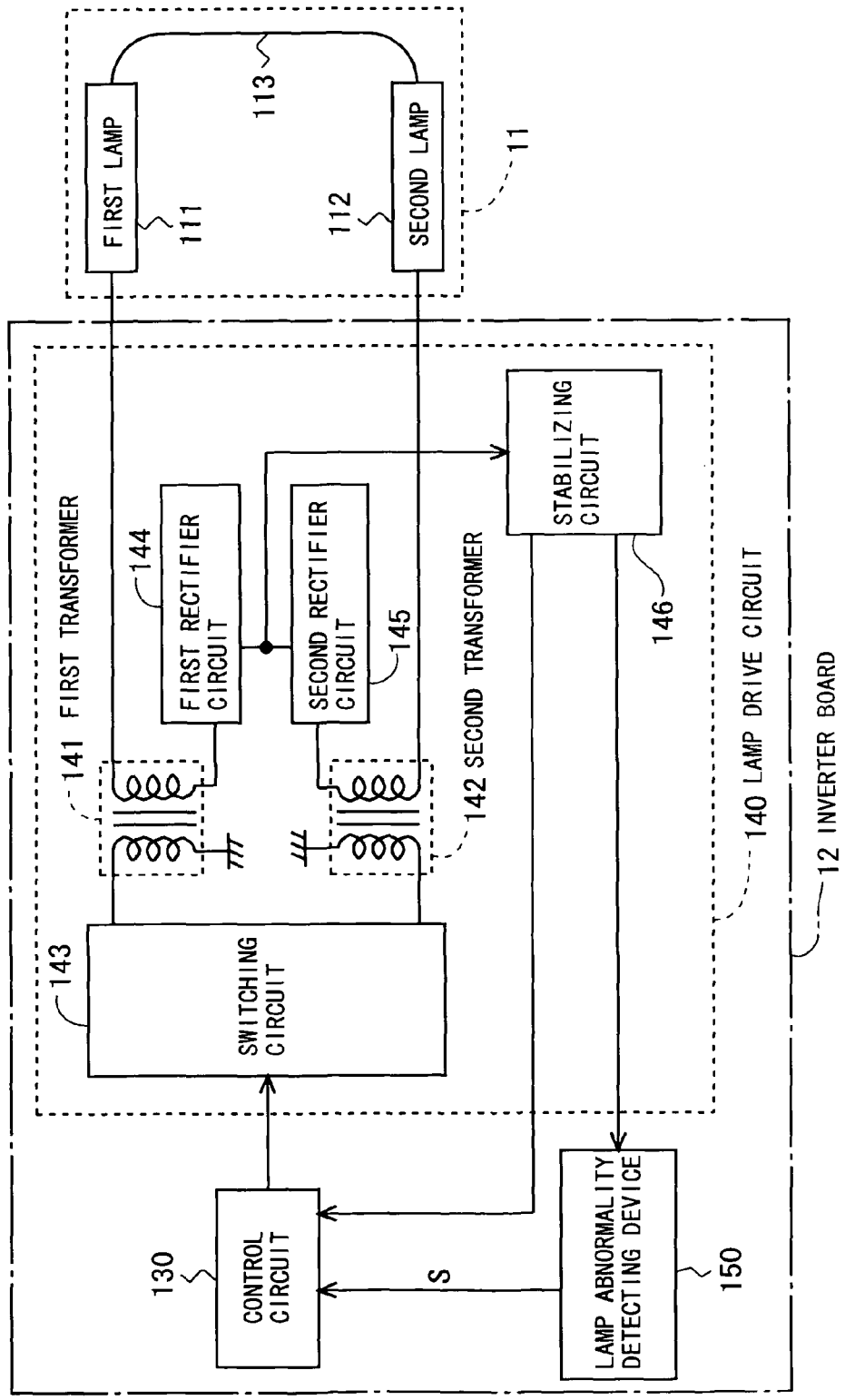
FIG. 4 is a block diagram showing detailed configurations of a pseudo U-shaped lamp and a lamp drive circuit in the embodiment.

FIG. 4 is a block diagram showing detailed configurations of a pseudo U-shaped lamp 11 and a lamp drive circuit 140. The pseudo U-shaped lamp 11 is configured by a first lamp 111, a second lamp 112, and a conductor 113 that connects the lamps 111 and 112. The lamp drive circuit 140 includes a first and second transformer 141 and 142 for applying an alternating voltage to the first and second lamps 111 and 112, respectively; a switching circuit 143 that supplies a voltage to primary sides of the respective first and second transformers 141 and 142; a first and a second rectifier circuit 144 and 145 for respectively half-wave rectifying currents flowing through secondary sides of the respective first and second transformers 141 and 142; and a stabilizing circuit 146 that combines and smoothes the currents having been half-wave rectified by the first and second rectifier circuits 144 and 145. Note that in the present embodiment, a current detection portion is implemented by the first and second rectifier circuits 144 and 145.

In such a configuration as described above, by the switching circuit 143 performing a switching operation by control performed by the control circuit 130, alternating voltages are generated on the secondary sides of the respective first and second transformers 141 and 142. Accordingly, the alternating voltages are applied to the first and second lamps 111 and 112, whereby the lamps 111 and 112 emit light. At this time, the currents flowing through the secondary sides of the respective first and second transformers 141 and 142 are respectively half-wave rectified by the first and second rectifier circuits 144 and 145 and the half-wave rectified currents are combined and smoothed by the stabilizing circuit 146. Then, the smoothed current is provided to the control circuit 130 and the lamp abnormality detecting device 150.

<3. Configuration and Operation of the Lamp Abnormality Detecting Device>

FIG. 1 is a block diagram showing a configuration of the lamp abnormality detecting device 150. The lamp abnormality detecting device 150 has a maximum/minimum extraction circuit 151, a subtraction circuit 152 serving as a differential circuit, and a comparison circuit 153. The maximum/minimum extraction circuit 151 includes a maximum current extraction circuit 1511 and a minimum current extraction circuit 1512. The subtraction circuit 152 includes an amplifier circuit 1521.

Supplied from the lamp drive circuits 140 to the maximum/minimum extraction circuit 151 are currents that flow through the secondary sides of the first and second transformers 141 and 142 of the lamp drive circuits 140 and that are rectified. In the maximum/minimum extraction circuit 151, the maximum current extraction circuit 1511 outputs, as a maximum current Imax, a current having a maximum current value among the currents supplied from the lamp drive circuits 140 and the minimum current extraction circuit 1512 outputs, as a minimum current Imin, a current having a minimum current value among the currents supplied from the lamp drive circuits 140. The subtraction circuit 152 receives the maximum current Imax and the minimum current Imin outputted from the maximum/minimum extraction circuit 151 and calculates a difference therebetween. Then, the difference is amplified by the amplifier circuit 1521 in the subtraction circuit 152 and the amplified difference is outputted from the subtraction circuit 152 as a voltage signal (hereinafter, referred to as the "differential voltage") ΔV.

Figure 5:
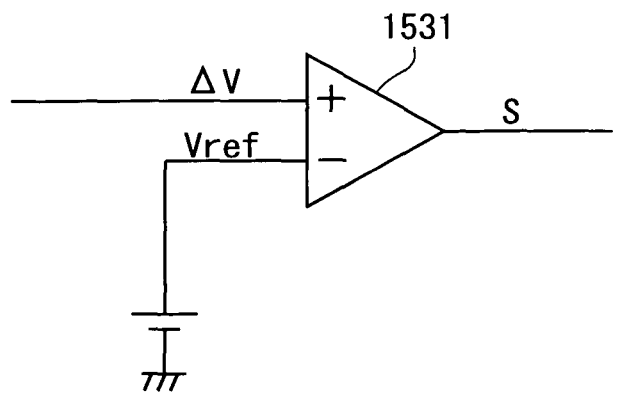
FIG. 5 is a circuit diagram showing a configuration of a comparison circuit in the embodiment.

The comparison circuit 153 compares the differential voltage ΔV with a predetermined threshold voltage Vref and outputs a control signal S representing a result of the comparison. FIG. 5 is a circuit diagram showing a configuration of the comparison circuit 153. The comparison circuit 153 is configured by a comparator 1531 having a plus terminal, a minus terminal, and an output terminal. A differential voltage ΔV is inputted to the plus terminal, a threshold voltage Vref serving as a reference value to compare with the differential voltage ΔV is inputted to the minus terminal, and a control signal S which is a digital signal is outputted from the output terminal. The comparator 1531 compares the differential voltage ΔV with the threshold voltage Vref and sets the value of the control signal S to "1" when the differential voltage ΔV is higher than the threshold voltage Vref and sets the value of the control signal S to "0" when the differential voltage ΔV is lower than or equal to the threshold voltage Vref.

The control circuit 130 receives a control signal S outputted from the comparison circuit 153 and allows the lamp drive circuits 140 to operate as they are when the value of the control signal S is "0" and stops the operations of the lamp drive circuits 140 when the value of the control signal S is "1".

<3.1 Operation at Normal Times>

Rectified currents are supplied to the maximum/minimum extraction circuit 151 from the lamp drive circuits 140 and the currents have comparable values. Accordingly, a difference between the value of a maximum current Imax and the value of a minimum current Imin outputted from the maximum/minimum extraction circuit 151 has a relatively small value. Hence, the value of a differential voltage ΔV outputted from the subtraction circuit 152 also has a relatively small value. As a result, the differential voltage ΔV is lower than or equal to the threshold voltage Vref and the value of a control signal S outputted from the comparison circuit 153 is "0". Thus, the control circuit 130 allows the lamp drive circuits 140 to operate as they are.

<3.2 Operation Upon a Conductor Break (At Abnormal Times)>

Rectified currents are supplied to the maximum/minimum extraction circuit 151 from the lamp drive circuits 140, and of the currents a current supplied from a lamp drive circuit 140 for driving a lamp 11 where a conductor break has occurred is larger than those supplied from other lamp drive circuits 140. Accordingly, a difference between the value of a maximum current Imax and the value of a minimum current Imin outputted from the maximum/minimum extraction circuit 151 has a relatively large value. Hence, the value of a differential voltage ΔV outputted from the subtraction circuit 152 also has a relatively large value. As a result, the differential voltage ΔV is higher than the threshold voltage Vref and the value of a control signal S outputted from the comparison circuit 153 is "1". Thus, the control circuit 130 stops the operations of the lamp drive circuits 140. As a result, the supply of a current to the lamps 11 stops.

<4. Effects>

As described above, according to the present embodiment, currents flowing through the secondary sides of the transformers 141 and 142 in the lamp drive circuits 140 respectively provided for the lamps 11 are detected and a maximum value and a minimum value of the currents are extracted. Then, a differential value between the maximum value and the minimum value is compared with a predetermined reference value. As a result, when the differential value is larger than the reference value, the control circuit 130 stops the operations of the lamp drive circuits 140. Here, when no abnormality occurs in the lamps 11, the magnitudes of currents flowing through the secondary sides of all the transformers 141 and 142 are comparable; whereas when an abnormality such as a conductor break occurs in any of the lamps 11, the magnitude of currents flowing through the secondary sides of respective transformers 141 and 142 provided for the lamp 11 where the abnormality has occurred is greater than those of currents flowing through the secondary sides of other transformers 141 and 142. Hence, when an abnormality occurs in any of the lamps 11, the above-described differential value is larger than the reference value and accordingly the operations of the lamp drive circuits 140 stop. Therefore, when an abnormality occurs in a lamp 11, excess currents can be prevented from flowing through the secondary sides of transformers 141 and 142, i.e., the high-voltage sides of the lamp 11. Moreover, since a differential value between a maximum value and a minimum value is compared with the reference value, even when the brightness of the lamps is changed, an abnormality in a lamp 11 can be detected, and accordingly, an excess current can be prevented from flowing through the high-voltage side of the lamp 11. As a result, damage and the like due to heat to components configuring the circuits can be prevented.

<5. Variant>

Figure 6:
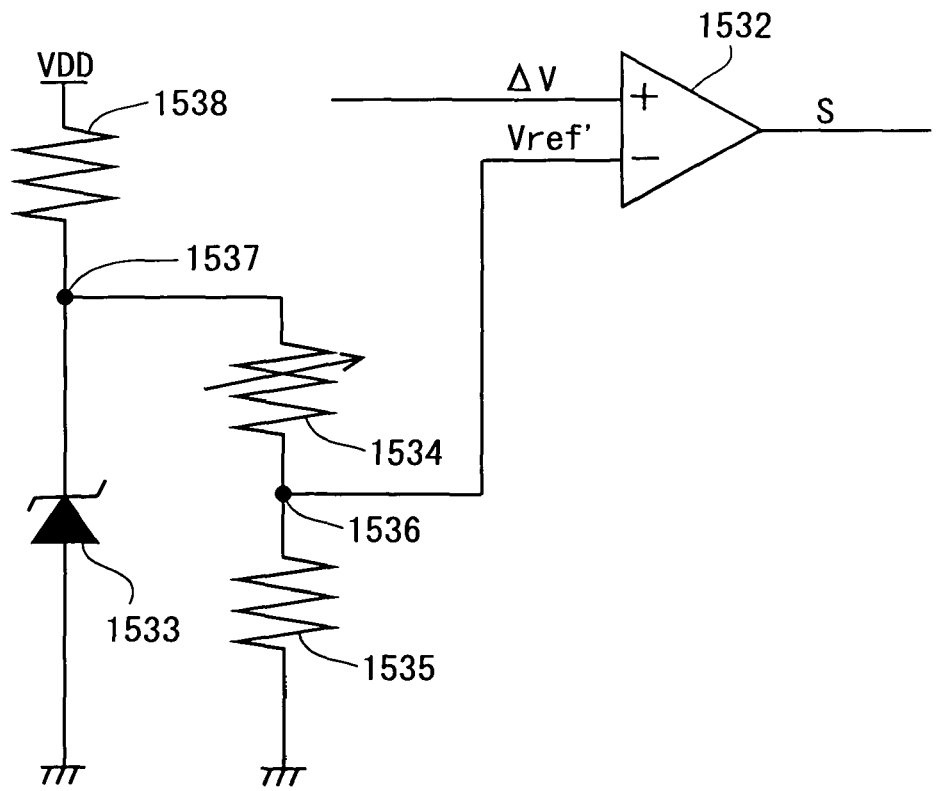
FIG. 6 is a circuit diagram showing a configuration of a comparison circuit in a variant of the embodiment.
Figure 7:
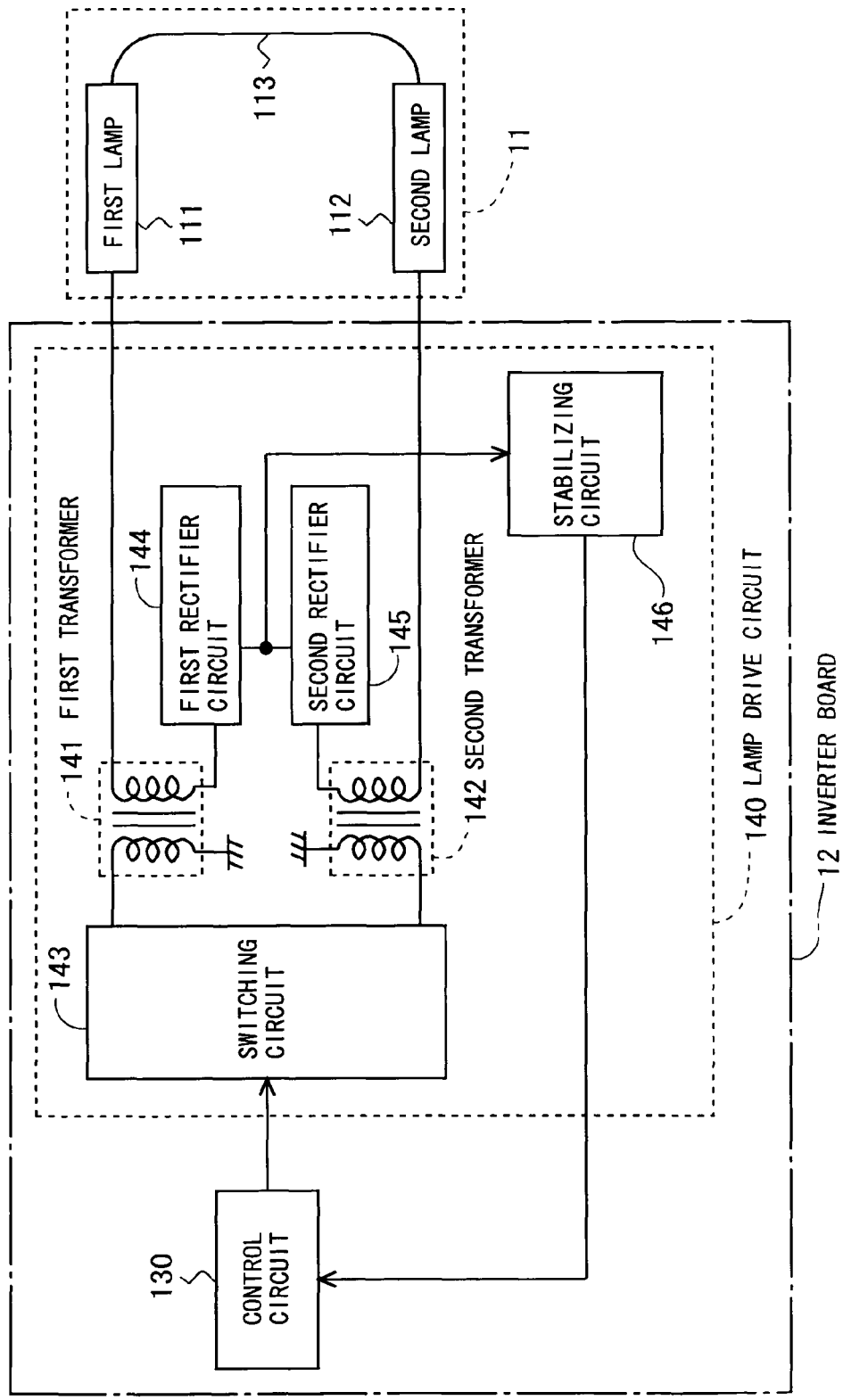
FIG. 7 is a block diagram showing a configuration of a backlight device that adopts pseudo U-shaped lamps in a conventional example.
Figure 8:
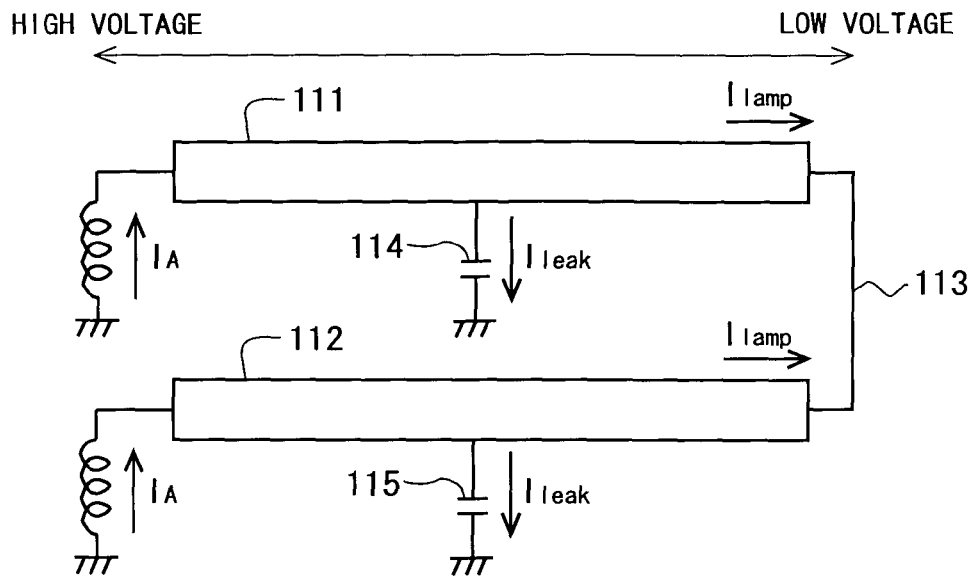
FIG. 8 is a diagram for describing currents flowing through a lamp at normal times.
Figure 9:
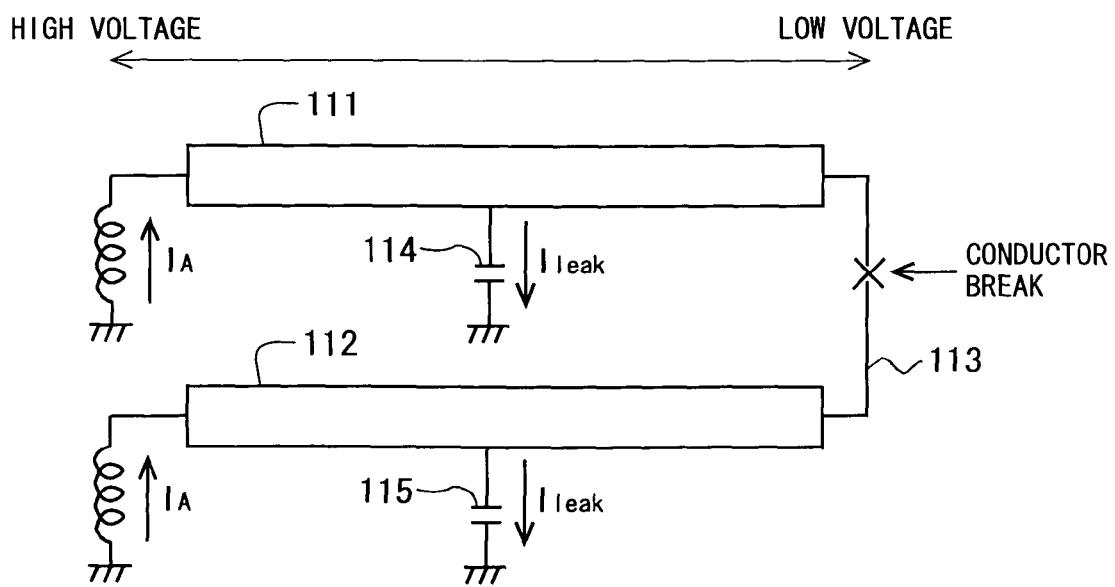
FIG. 9 is a diagram for describing currents flowing through the lamp when a conductor break has occurred.

Although in the above-described embodiment, the configuration is such that a differential voltage ΔV is compared with a predetermined threshold voltage Vref in the comparison circuit 153 of the lamp abnormality detecting device 150, the present invention is not limited thereto. For example, the configuration may be such that a threshold voltage Vref' for comparing with a differential voltage ΔV is dynamically changed according to the brightness of the lamps 11. FIG. 6 is a circuit diagram showing a configuration of a comparison circuit 153 in which a threshold voltage Vref' is dynamically changed. The comparison circuit 150 is configured by a comparator 1532, a Zener diode 1533, a variable resistor 1534, and resistors 1535 and 1538. One end of the variable resistor 1534 and one end of the resistor 1535 are connected to each other and by those two resistors a voltage dividing circuit is configured. The other end of the variable resistor 1534 is connected to an output terminal of the Zener diode 1533 and one end of the resistor 1538. The other end of the resistor 1535 is grounded. The other end of the resistor 1538 is connected to a power supply voltage VDD. A connection point between the variable resistor 1534 and the resistor 1535 is connected to a minus terminal of the comparator 1532. An input terminal of the Zener diode 1533 is grounded and the output terminal is connected to the resistor 1538 and the variable resistor 1534. With such a configuration, the potential of the power supply voltage VDD is maintained at a connection point 1537. For example, when the power supply voltage is 5V, the potential at the connection point 1537 is maintained at 5V.

In such a configuration as described above, by changing the resistance value of the variable resistor 1534, the potential at the connection point 1536 changes. As a result, the value of a threshold voltage Vref' inputted to the minus terminal of the comparator 1532 changes. Here, from the control circuit 130 a voltage signal that specifies brightness is outputted and the configuration may be such that the resistance value of the variable resistor 1534 is changed based on the voltage signal. Therefore, the value of a threshold voltage Vref' for comparing with the above-described differential voltage $\Delta V$ can be changed according to brightness, and accordingly the accuracy of detection of an abnormality in the lamps 11 can be increased.

Although description is made of an example case of a conductor break in a pseudo U-shaped lamp 11 in the above-described embodiment, the present invention is not limited thereto. For example, also when a lamp 11 is broken, the operations of the lamp drive circuits 140 stop since the difference between a maximum current Imax and a minimum current Imin is large for the same reason as that upon a conductor break. As such, since an abnormality other than a conductor break in a lamp 11 can also be detected, the lamp abnormality detecting device according to the present invention can be applied to both U-shaped lamps and straight-tube type lamps.

The invention claimed is:

1. A lamp abnormality detecting device that detects an abnormality occurred in any of a plurality of lamps which are feedback-controlled by a current, the lamp abnormality detecting device comprising:
   a current detection portion that detects currents flowing through the respective lamps;
   a maximum current extraction portion that extracts a current having a maximum value among the currents detected in the respective lamps by the current detection portion;
   a minimum current extraction portion that extracts a current having a minimum value among the currents detected in the respective lamps by the current detection portion;
   a differential circuit that calculates a differential value representing a difference between the value of the current extracted by the maximum current extraction portion and the value of the current extracted by the minimum current extraction portion and outputs the differential value; and
   a comparison circuit that compares the differential value outputted from the differential circuit with a threshold value which serves as a reference for whether an abnormality has occurred in the plurality of lamps, and outputs a result of the comparison.

2. The lamp abnormality detecting device according to claim 1, wherein
   the comparison circuit has a voltage dividing circuit that includes at least one variable resistor and that generates a threshold voltage representing the threshold value by dividing a predetermined constant voltage, and
   the threshold voltage changes with a change in a resistance value of the variable resistor.

3. The lamp abnormality detecting device according to claim 1, wherein the differential circuit includes an amplifier circuit that amplifies the difference between the value of the current extracted by the maximum current extraction portion and the value of the current extracted by the minimum current extraction portion and outputs the amplified difference as the differential value.

4. An inverter for driving a plurality of lamps, the inverter comprising:
   a lamp abnormality detecting device that detects an abnormality occurred in any of the plurality of lamps which are feedback-controlled by a current;
   a lamp drive circuit which includes a transformer and drives the plurality of lamps by generating an alternating voltage on a secondary side of the transformer; and
   a control circuit that controls operation of the lamp drive circuit, wherein
   the lamp abnormality detecting device includes:
      a current detection portion that detects currents flowing through the respective lamps;
      a maximum current extraction portion that extracts a current having a maximum value among the currents detected in the respective lamps by the current detection portion;
      a minimum current extraction portion that extracts a current having a minimum value among the currents detected in the respective lamps by the current detection portion;
      a differential circuit that calculates a differential value representing a difference between the value of the current extracted by the maximum current extraction portion and the value of the current extracted by the minimum current extraction portion and outputs the differential value; and
      a comparison circuit that compares the differential value outputted from the differential circuit with a threshold value which serves as a reference for whether an abnormality has occurred in the plurality of lamps, and outputs a result of the comparison, and
   the control circuit stops the operation of the lamp drive circuit when the result of the comparison outputted from the comparison circuit indicates that the differential value is larger than the threshold value.

5. A backlight device that emits light onto a display portion of a display device from a back side, the backlight device comprising:
   a plurality of lamps; and
   an inverter having a lamp abnormality detecting device that detects an abnormality occurred in any of the plurality of lamps which are feedback-controlled by a current; a lamp drive circuit which includes a transformer and drives the plurality of lamps by generating an alternating voltage on a secondary side of the transformer; and a control circuit that controls operation of the lamp drive circuit, wherein
   the lamp abnormality detecting device includes:
      a current detection portion that detects currents flowing through the respective lamps;

a maximum current extraction portion that extracts a current having a maximum value among the currents detected in the respective lamps by the current detection portion;

a minimum current extraction portion that extracts a current having a minimum value among the currents detected in the respective lamps by the current detection portion;

a differential circuit that calculates a differential value representing a difference between the value of the current extracted by the maximum current extraction portion and the value of the current extracted by the minimum current extraction portion and outputs the differential value; and a comparison circuit that compares the differential value outputted from the differential circuit with a threshold value which serves as a reference for whether an abnormality has occurred in the plurality of lamps, and outputs a result of the comparison, and the control circuit stops the operation of the lamp drive circuit when the result of the comparison outputted from the comparison circuit indicates that the differential value is larger than the threshold value.

6. The backlight device according to claim 5, wherein the comparison circuit has a voltage dividing circuit that includes at least one variable resistor and that generates a threshold voltage representing the threshold value by dividing a predetermined constant voltage, and the threshold voltage changes with a change in a resistance value of the variable resistor.

7. The backlight device according to claim 5, wherein the differential circuit includes an amplifier circuit that amplifies the difference between the value of the current extracted by the maximum current extraction portion and the value of the current extracted by the minimum current extraction portion and outputs the amplified difference as the differential value.

8. The backlight device according to claim 5, wherein the plurality of lamps are pseudo U-shaped lamps, each of which has two cold cathode fluorescent lamps connected to each other by a conductor and arranged in a U shape.

9. A display device comprising:

a backlight device that emits light onto a display portion of the display device from a back side, wherein the backlight device includes:
    a plurality of lamps; and
    an inverter having a lamp abnormality detecting device that detects an abnormality occurred in any of the plurality of lamps which are feedback-controlled by a current; a lamp drive circuit which includes a transformer and drives the plurality of lamps by generating an alternating voltage on a secondary side of the transformer; and a control circuit that controls operation of the lamp drive circuit, the lamp abnormality detecting device includes:
    a current detection portion that detects currents flowing through the respective lamps;
    a maximum current extraction portion that extracts a current having a maximum value among the currents detected in the respective lamps by the current detection portion;
    a minimum current extraction portion that extracts a current having a minimum value among the currents detected in the respective lamps by the current detection portion;
    a differential circuit that calculates a differential value representing a difference between the value of the current extracted by the maximum current extraction portion and the value of the current extracted by the minimum current extraction portion and outputs the differential value; and
    a comparison circuit that compares the differential value outputted from the differential circuit with a threshold value which serves as a reference for whether an abnormality has occurred in the plurality of lamps, and outputs a result of the comparison, and the control circuit stops the operation of the lamp drive circuit when the result of the comparison outputted from the comparison circuit indicates that the differential value is larger than the threshold value.

* * * * *